US012442693B2

(12) United States Patent
Gebhardt et al.

(10) Patent No.: US 12,442,693 B2
(45) Date of Patent: Oct. 14, 2025

(54) TEMPERATURE SENSOR ASSEMBLY

(71) Applicant: ABB Schweiz AG, Baden (CH)

(72) Inventors: Joerg Gebhardt, Mainz (DE); Patric Ackermann, Fischbachtal (DE); Subhashish Dasgupta, Bangalore (IN); Wilhelm Daake, Petershagen (DE); Karsten Schroeder, Petershagen (DE); Guruprasad Sosale, Munich (DE)

(73) Assignee: ABB Schweiz AG, Baden (CH)

( * ) Notice: Subject to any disclaimer, the term of this patent is extended or adjusted under 35 U.S.C. 154(b) by 650 days.

(21) Appl. No.: 17/878,143

(22) Filed: Aug. 1, 2022

(65) Prior Publication Data

US 2023/0030690 A1    Feb. 2, 2023

(30) Foreign Application Priority Data

Aug. 2, 2021   (EP) ..................................... 21189173

(51) Int. Cl.
*G01K 1/143*      (2021.01)
*G01K 1/02*       (2021.01)
(Continued)

(52) U.S. Cl.
CPC ............. *G01K 1/143* (2013.01); *G01K 1/026* (2013.01); *G01K 1/08* (2013.01); *G01K 1/16* (2013.01);
(Continued)

(58) Field of Classification Search
CPC .......... G01K 1/143; G01K 1/026; G01K 1/08; G01K 1/16; G01K 3/14; G01K 7/42; G01K 7/427; G01K 13/02
See application file for complete search history.

(56) References Cited

U.S. PATENT DOCUMENTS

| 3,336,804 A | * | 8/1967 | Poppendiek | A61B 5/028 |
| | | | | 374/E1.018 |
| 9,360,377 B2 | * | 6/2016 | Converse | G01K 13/00 |
| (Continued) | | | | |

FOREIGN PATENT DOCUMENTS

| DE | 102017122442.4 | 9/2017 |
| DE | 102018119857 A1 | 2/2020 |
| (Continued) | | |

OTHER PUBLICATIONS

Gebhardt et al., "Accurate and quickly responsive surface temperature measurement: a step to widespread non-invasive T-measurement in industry," *2019 IEEE International Instrumentation and Measurement Technology Conference (I2MTC)*, pp. 1-6 (May 20-23, 2019).

(Continued)

*Primary Examiner* — Laura Martin
*Assistant Examiner* — Philip L Cotey
(74) *Attorney, Agent, or Firm* — Leydig, Voit & Mayer, Ltd.

(57) ABSTRACT

A temperature sensor assembly configured to be coupled thermally to a vessel wall for determining a temperature of a surface of the vessel wall is provided, the assembly includes: a first single-branched thermal conduction path, between the surface of the vessel wall and an environment of the temperature sensor assembly, comprising a temperature measurement sensor, configured to be thermally coupled to a first site of the surface of the vessel wall resulting in a first thermal resistance; and a second single-branched thermal conduction path, between a second site of the surface of the vessel wall and an environment of the temperature sensor assembly, comprising a reference temperature sensor, configured to be thermally coupled to the (Continued)

surface of the vessel wall resulting in a second thermal resistance.

12 Claims, 5 Drawing Sheets

(51) Int. Cl.
    *G01K 1/08*      (2021.01)
    *G01K 1/16*      (2006.01)
    *G01K 3/14*      (2006.01)
    *G01K 7/42*      (2006.01)
    *G01K 13/02*     (2021.01)

(52) U.S. Cl.
    CPC ............... *G01K 3/14* (2013.01); *G01K 7/42* (2013.01); *G01K 7/427* (2013.01); *G01K 13/02* (2013.01)

(56) References Cited

U.S. PATENT DOCUMENTS

| | | | | |
|---|---|---|---|---|
| 9,678,025 B1* | 6/2017 | Fesmire | ................ | G01N 25/72 |
| 10,555,374 B2* | 2/2020 | Schryver | ................ | G01K 3/10 |
| 2005/0217841 A1* | 10/2005 | Van Den Ende | ...... | G01K 17/20 |
| | | | | 374/E1.019 |
| 2008/0163692 A1* | 7/2008 | Huang | ................ | G01K 1/143 |
| | | | | 374/E1.019 |
| 2014/0161151 A1* | 6/2014 | Proctor | ................ | G01K 13/02 |
| | | | | 374/147 |
| 2014/0177673 A1* | 6/2014 | Bliss | ................ | F28G 15/003 |
| | | | | 374/165 |
| 2015/0185085 A1* | 7/2015 | Converse | ................ | G01K 1/143 |
| | | | | 374/100 |
| 2017/0023415 A1* | 1/2017 | Decker | ................ | G01K 1/143 |
| 2017/0074730 A1* | 3/2017 | Rieder | ................ | G01K 7/427 |
| 2018/0003655 A1* | 1/2018 | Rud | ................ | G01K 1/024 |
| 2018/0094990 A1* | 4/2018 | Rud | ................ | G01K 13/02 |
| 2020/0103287 A1* | 4/2020 | Rud | ................ | G01K 7/021 |
| 2020/0225096 A1* | 7/2020 | Ude | ................ | G01K 7/427 |
| 2021/0181032 A1* | 6/2021 | Gebhardt | ................ | G01K 13/02 |
| 2022/0155156 A1* | 5/2022 | Kida | ................ | H10N 10/80 |
| 2022/0205848 A1* | 6/2022 | Barton | ................ | G01K 1/143 |
| 2022/0228927 A1* | 7/2022 | Noel | ................ | G01K 13/02 |

FOREIGN PATENT DOCUMENTS

| | | |
|---|---|---|
| WO | WO 2015/099933 A1 | 7/2015 |
| WO | WO 2019/063519 A1 | 4/2019 |
| WO | WO 2020/035260 A1 | 2/2020 |

OTHER PUBLICATIONS

Gebhardt et al., "Non-invasive temperature measurement of turbulent flows of aqueous solutions and gases in pipes," *Technisches Messen*, 87(9): 553-563 (Aug. 13, 2020).

European Patent Office, Extended European Search Report in European Patent Application No. 21189173.4, 9 pp. (Jan. 20, 2022).

* cited by examiner

TEMPERATURE SENSOR ASSEMBLY

CROSS-REFERENCE TO RELATED APPLICATIONS

This patent application claims priority to European Patent Application No. 21189173.4, filed on Aug. 2, 2021, which is incorporated herein in its entirety by reference.

FIELD OF THE DISCLOSURE

The present disclosure invention relates generally to temperature measuring assemblies for use with industrial processes and, more particularly, to temperature measurement assemblies for non-intrusive process temperature measurements.

BACKGROUND OF THE INVENTION

Determination of temperatures are vital for safe running of facilities, as being one of the main control parameters for process control. Ensuring that temperature measurements of process media are accurate and repeatable is critical.

For determination of a temperature of a medium within a vessel typically surface temperature sensors are placed at a surface of a wall of the vessel in order to measure the temperature of this surface, and respectively determine the temperature of the medium at the other side of the wall.

The problem to be solved here is related to an accurate, reliable and fast responding surface temperature measurement by contact thermometry.

BRIEF SUMMARY OF THE INVENTION

Non-intrusive industrial process temperature measurement assemblies may be used to measure a temperature of a process fluid within a vessel without the need to penetrate a process vessel wall at the surface of the vessel wall. Such an assembly may include a temperature sensor and a structure adapted to position a temperature sensing probe tip of the temperature sensor on an exterior surface of the vessel wall. As the process fluid temperature changes, the vessel wall temperature will also change. The vessel wall temperature will also change in response to ambient conditions, such as sunlight, wind, or rain. Insulation around the probe tip provides some shielding of the exterior surface from changes in ambient conditions. However, to the extent the insulation is less than ideal, the accuracy of non-intrusive process temperature measurements is impaired. To improve the surface temperature measurement by contact thermometry, measurements assemblies including a temperature measurement sensor and a reference temperature sensor can be used, which are in an at least slightly different thermal contact to the surface. The temperature measurement sensor is usually distinguished by the property that its thermal coupling to the surface is chosen to be stronger, that means with lower thermal resistance, than for the one or several reference temperature sensors.

Such assemblies can give rise to problems in respect to a robustness of the concept. A major problem of non-intrusive process temperature measurements (NiTM) is the reproducible manufacturing and mounting of the temperature measurement device with respect to its internal thermal behaviour, that is the thermal resistances of individual parts of the measurement device, and its thermal interaction with its ambient. E.g., the coupling of the thermal paths may be not well defined in manufacturing or may change over time during usage of the assemblies. It can cause large efforts and/or costs to reduce tolerances or increase durability of the couplings.

Aspects of the present disclosure relate to a temperature sensor assembly configured to be coupled thermally to a vessel wall for determining a temperature of a surface of the vessel wall, a method for determining a medium temperature, a measurement system, and a use of the temperature sensor assembly.

To achieve these and other advantages and in accordance with the purpose of the invention, as embodied and broadly described herein, there is provided a temperature sensor assembly configured to be coupled thermally to a vessel wall for determining a temperature of a surface of the vessel wall, wherein the assembly includes a first single-branched thermal conduction path, between the surface of the vessel wall and an environment of the temperature sensor assembly, with a temperature measurement sensor, configured to be thermally coupled to a first site of the surface of the vessel wall resulting in a first thermal resistance, and a second single-branched thermal conduction path, between a second site of the surface of the vessel wall and an environment of the temperature sensor assembly, comprising a reference temperature sensor, configured to be thermally coupled to the surface of the vessel wall resulting in a second thermal resistance.

BRIEF DESCRIPTION OF THE SEVERAL VIEWS OF THE DRAWING(S)

The accompanying drawings, which are included to provide a further understanding of the invention and are incorporated in and constitute a part of this application, illustrate embodiments of the invention and together with the description serve to explain the principle of the invention.

Figure 9A:
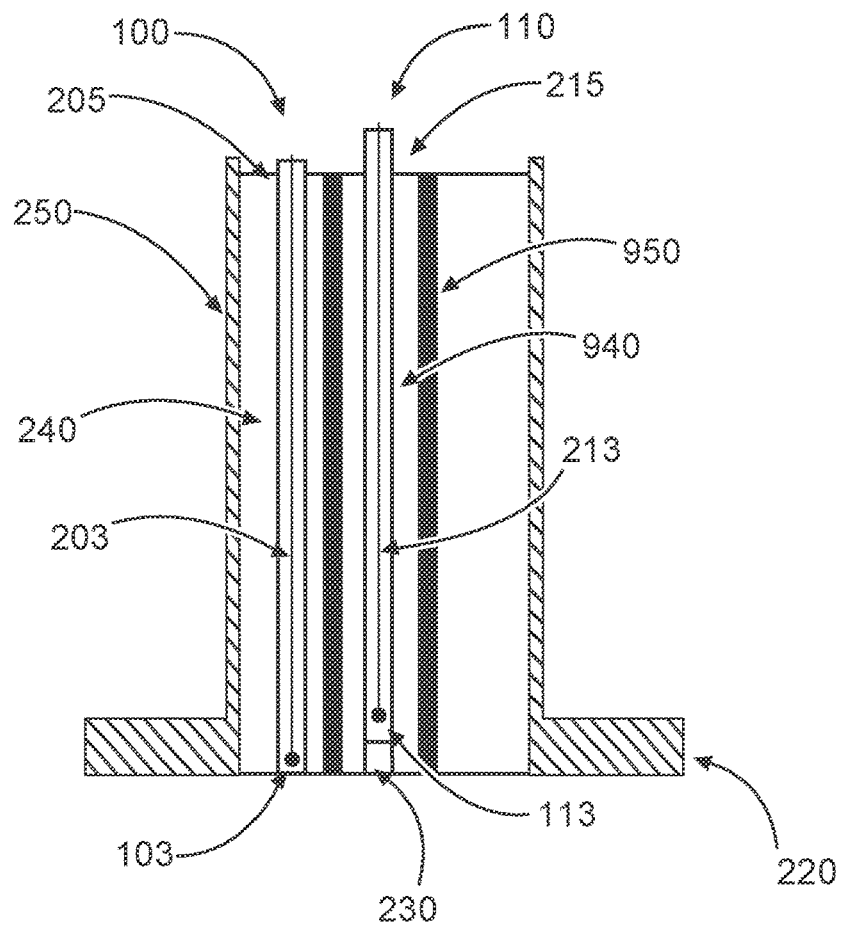
Figure 9B:
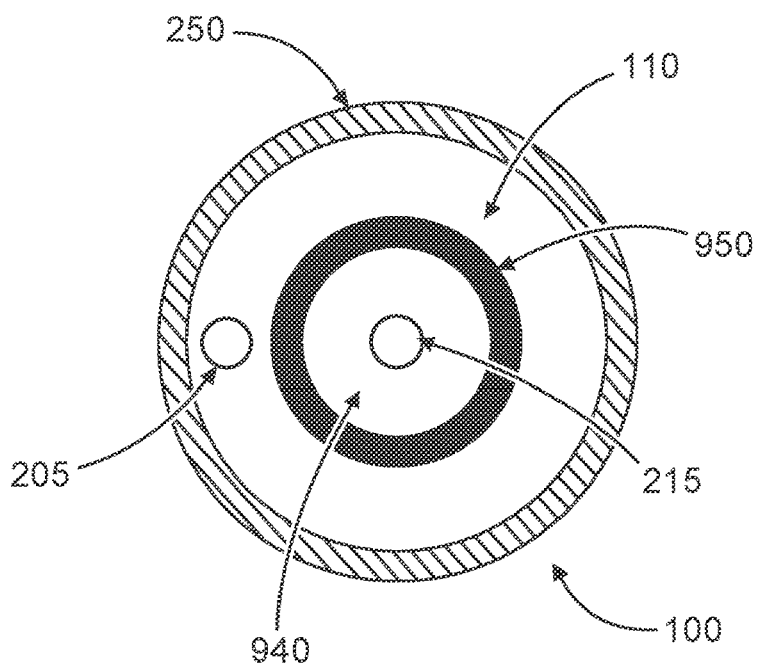

Each of FIGS. 9a and 9b is a schematic drawing from a different perspective of a temperature sensor assembly with a second tube mounted essentially concentrically inside of the neck tube in accordance with the disclosure.

DETAILED DESCRIPTION OF THE INVENTION

Figure 1A:
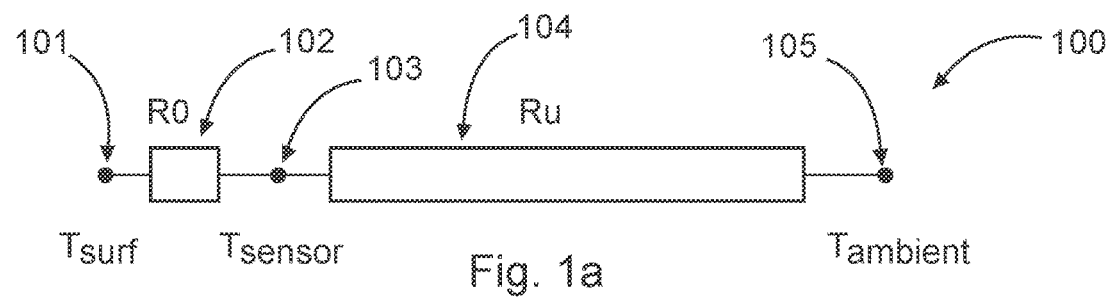
FIG. 1a is a schematic scheme of the thermal resistance of a first single-branched thermal conduction path in accordance with the disclosure.
Figure 1B:
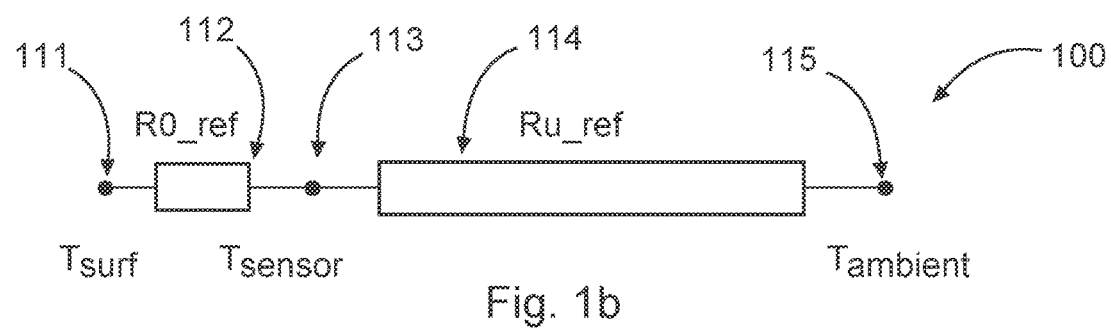
FIG. 1b is a schematic scheme of the thermal resistance of a second single-branched thermal conduction path in accordance with the disclosure.

FIGS. 1a and 1b sketch schematically the thermal resistance R0 102 between the temperature measurement sensor 103 and a first surface site of the vessel wall 101 as well as a thermal resistance Ru 104 between the temperature measurement sensor 103 and the ambient 105 of the first single-branched thermal conduction path 100. These figures also sketch schematically the thermal resistance R0_ref 112 between the reference temperature sensor 113 and a second surface site of the vessel wall 111 as well as the thermal resistance Ru_ref 114 between the reference temperature sensor 113 and the ambient 115 of the second single-branched thermal conduction path 110.

Figure 2:
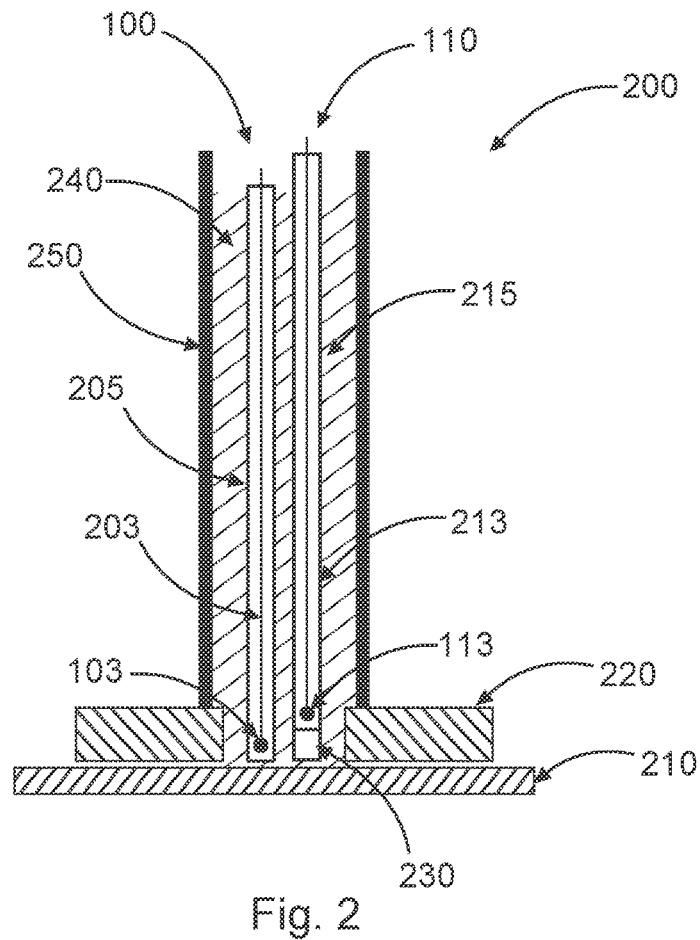
FIG. 2 is a schematic drawing of a temperature sensor assembly in accordance with the disclosure.

FIG. 2 sketches schematically a temperature sensor assembly 200 including a first single-branched thermal conduction path 100 and the second single-branched thermal conduction path 110. The two conduction paths 100, 110 are arranged within a neck tube 250, which is filled with insulation material 240 for thermally decoupling the first and the second single-branched thermal conduction path 100 and 110 in respect to the other single-branched thermal conduction path 100, 110 respectively and each of the single-branched thermal conduction path in respect to an environment of the tube 250. The temperature sensor assembly 200 can be thermally coupled to the wall of the vessel 210 by a mounting means 220.

A tip of the first single-branched conduction path 100, which is in close vicinity to the surface of the vessel wall 210, is mechanically coupled directly to the surface of the wall of the vessel 210 having the thermal resistance R0 between the temperature measurement sensor 103 and the surface of the vessel wall 210.

Electric leads 203, e.g. in form of sheathed cables, for the temperature measurement sensor 103 can preferably be located within a standard thermometer rod 205, which can preferably be made of a low thermal conductivity material such as stainless steel and the sheathed cable can be mineral-insulated inside of the standard thermometer rod 205.

A tip of the second single-branched conduction path 110, which is thermally coupled with the surface of the vessel wall 210, by a distance gap 230 having a thermal resistance R0_ref between the reference temperature sensor 113 and the surface of the vessel wall 210.

Electric leads 213, e.g. in form of sheathed cables, for the reference temperature sensor 113 can preferably be located within a standard thermometer rod 215, which can preferably be made of a low thermal conductivity material such as stainless steel and the sheathed cable can be mineral-insulated inside of the thermometer rod 215.

Figure 3:
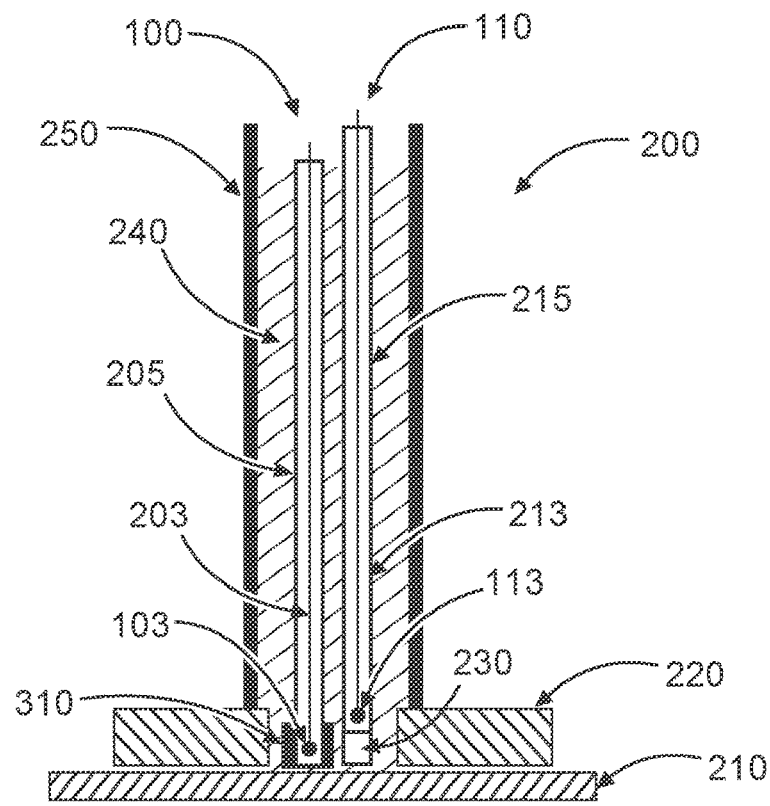
FIG. 3 is a schematic drawing of another temperature sensor assembly in accordance with the disclosure.

FIG. 3 sketches schematically another temperature sensor assembly 200 according to the temperature sensor assembly 200 as shown in FIG. 2, but with the difference that the tip of the first single-branched thermal conduction path, which may be the tip of a standard thermometer rod 205, is coupled to the surface of the vessel wall 210 by a plug 310, having a first means for thermal coupling the temperature measurement sensor 103 to the surface of the wall of the vessel 210 comprising highly thermal conducting material for improving the thermal coupling between the temperature measurement sensor 103 and the surface of the wall of the vessel 210, to decrease the thermal resistance R0 102, and wherein the first means is placed between the temperature measurement sensor 103 and the surface of the wall of the vessel 210.

Figure 4:
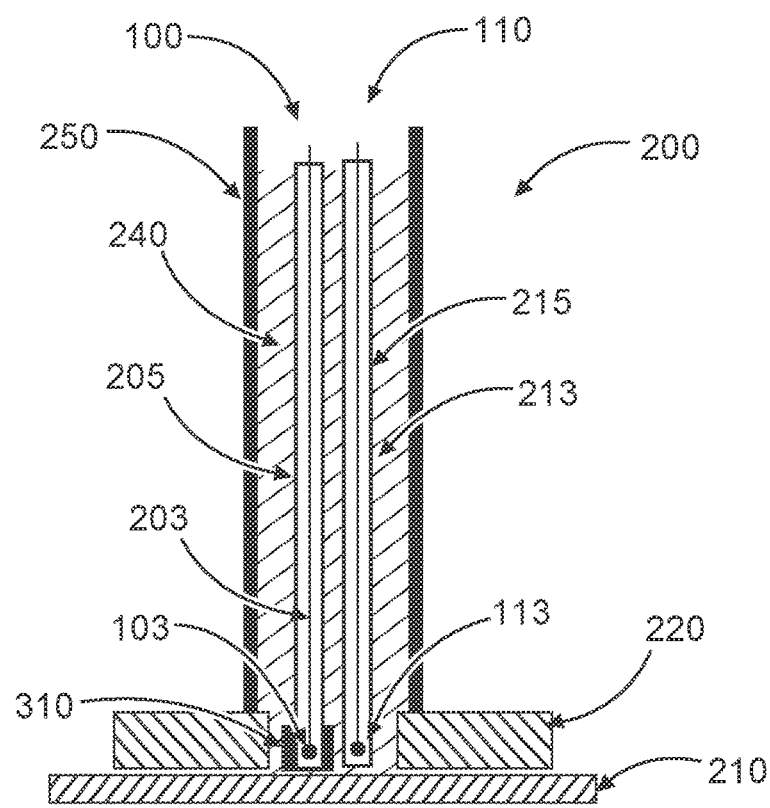
FIG. 4 is a schematic drawing of another temperature sensor assembly in accordance with the disclosure.

FIG. 4 sketches schematically a further temperature sensor assembly 200 according to the temperature sensor assembly 200 as shown in FIG. 3, but the tip of the second single-branched thermal conduction path 110, which is in the vicinity of the surface of the wall of the vessel 210, including the reference temperature sensor 113 is directly thermally coupled to the surface of the wall of the vessel 210.

Figure 5:
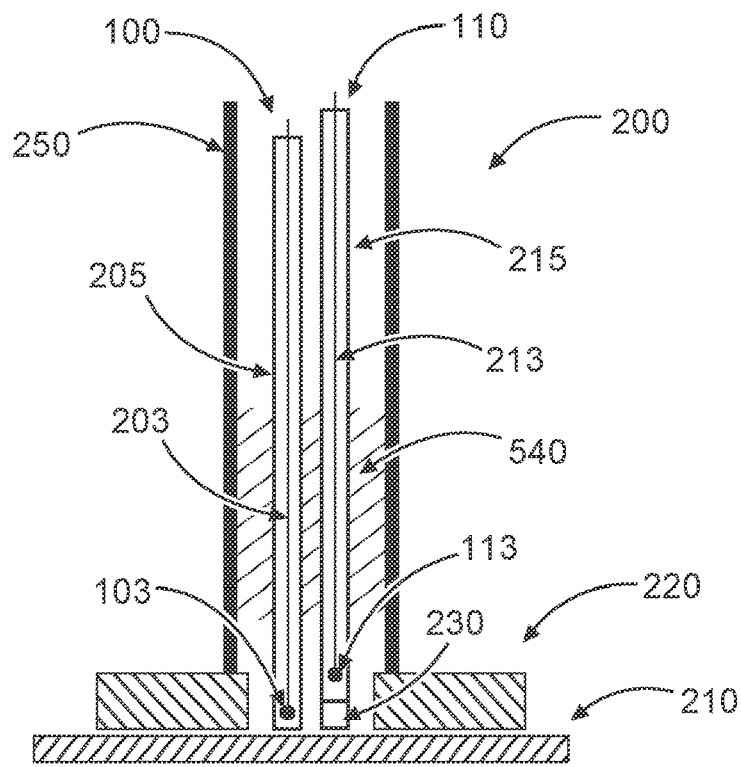
FIG. 5 is a schematic drawing of a temperature sensor assembly configured inside of a neck tube in accordance with the disclosure.

FIG. 5 sketches schematically a further temperature sensor assembly 200 according to the temperature sensor assembly 200 as shown in FIG. 2, but wherein the tube 250 is filled by insulation material only partially, mainly to fix the position of the first and second single-branched thermal conduction path 100 and 110.

Figure 6:
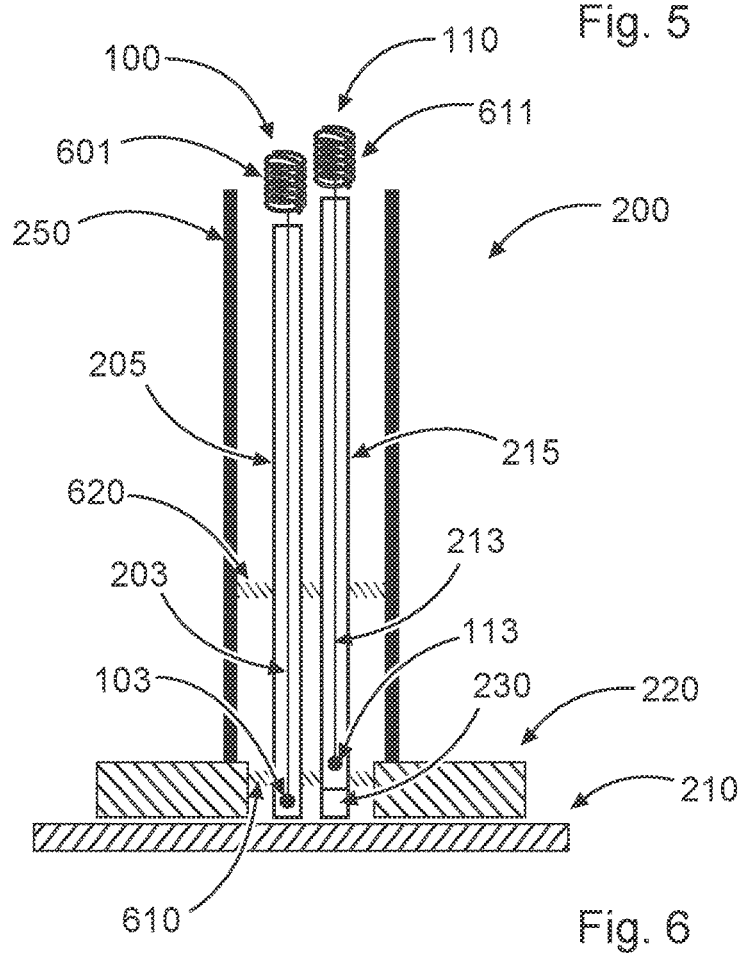
FIG. 6 is a schematic drawing of a temperature sensor assembly spring-loaded contacts to the surface in accordance with the disclosure.

FIG. 6 sketches schematically another temperature sensor assembly 200 according to the temperature sensor assembly 200 as shown in FIG. 5, but without the insulation material. To fix the first and second single-branched thermal conduction path 100 and 110 within the tube 250 mechanically, coupling elements 610 and 620 are provided, which are only weakly thermally conductive. Additionally the first and the second single-branched thermal conduction path 100 and 110, which may be formed as standard thermometer rods, are coupled to the respective surface sides at the surface of the vessel wall 210 mechanically by a first spring 601 and a second spring 611 respectively to provide spring-loaded mechanical contacts.

Figure 7:
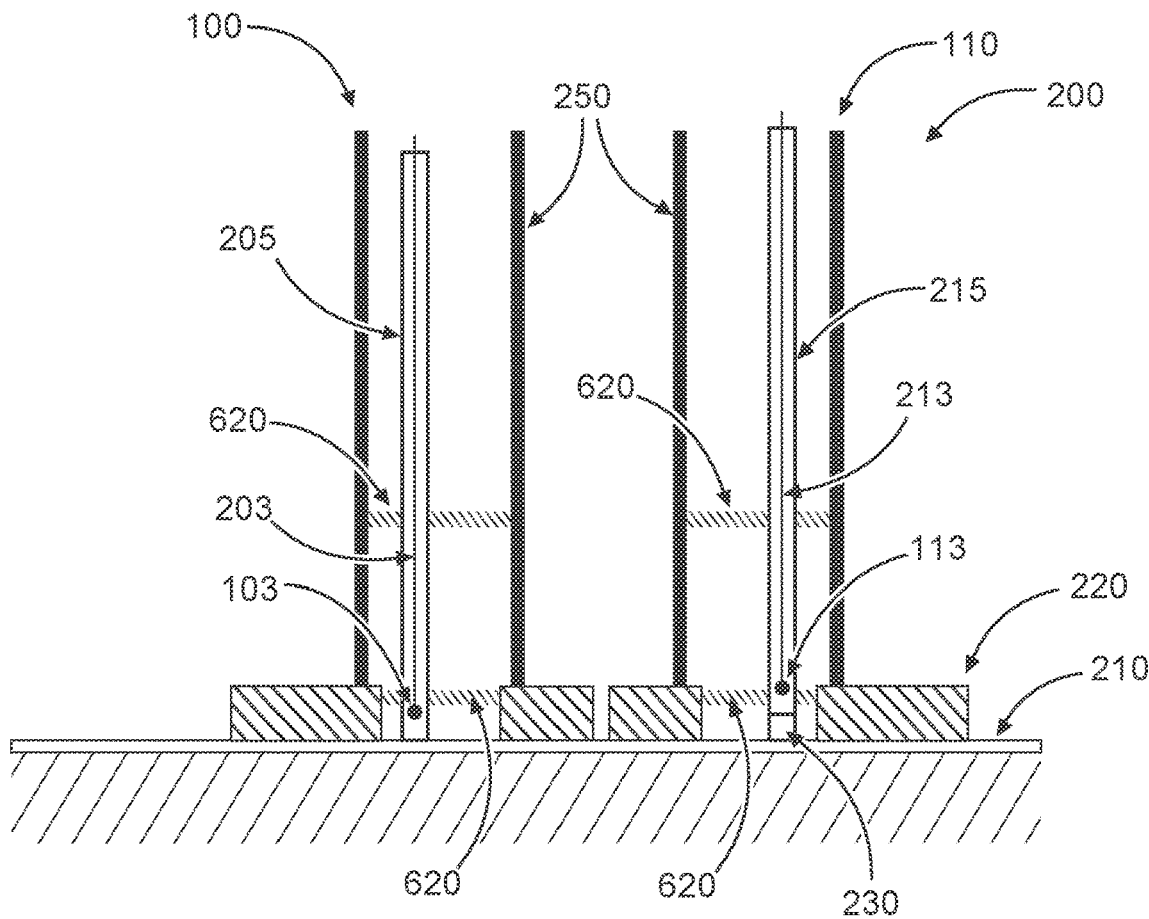
FIG. 7 is a schematic drawing of a temperature sensor assembly configured with two neck tubes in accordance with the disclosure.

FIG. 7 sketches schematically another temperature sensor assembly 200, wherein the first single-branched thermal conduction path 100 is arranged within a neck tube 250 and the second single-branched thermal conduction path 110 is arranged within another neck tube 250. The thermal coupling of the first single-branched thermal conduction path 100 is configured as shown in FIG. 6 and also the thermal coupling of the second single-branched thermal conduction path 110 is configured as shown in FIG. 6.

Figure 8:
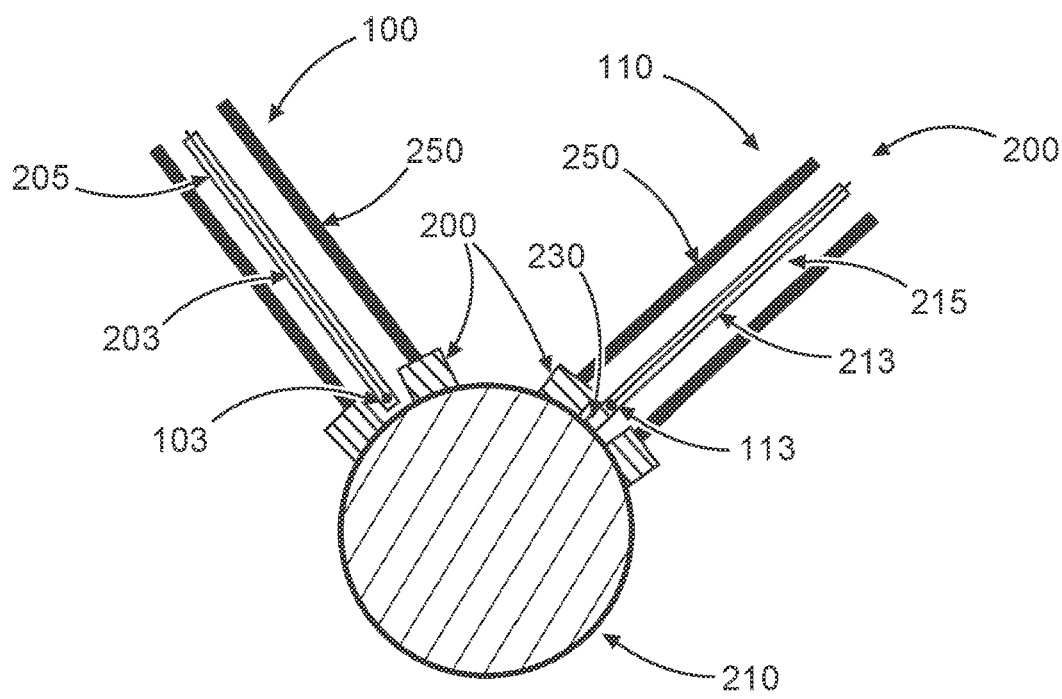
FIG. 8 is a schematic drawing of a temperature sensor assembly attached to a pipe/tank perimeter in accordance with the disclosure.

FIG. 8a sketches schematically how the temperature sensor assembly 200 as shown in FIG. 7 can be arranged on the curved surface of the vessel wall 210.

FIGS. 9a and 9b depict an assembly of concentric cylinders 250, 950, wherein the inner cylinder 950 is evacuated for thermal isolation, and thermally coupled to the surface of the wall of the pipe 220. A reference sensor 215 is arranged within the inner cylindrical space of the inner cylinder 950 and thermally coupled to the wall of the pipe 220 via a non-conducting or low conductivity material 230. The measurement sensor 205 is mounted in an annular space between the inner 950 and the outer cylinder 250 and strong mechanically and directly, or via a high conductivity material, thermally coupled to the wall of the pipe 220. Alternatively, the reference sensor 215 can be mounted in the annular space and the measurement sensor 205 can be mounted in the inner cylindrical space of the inner cylinder 950. Alternately, the outer annular space can be evacuated or both the inner cylinder 950 and annular space can be evacuated.

The term vessel, as understood here, can include any wall separating a medium from the ambient, as for instance a tube, a pipe or a tank or container etc.

For the skilled person, the term "single-branched thermal conduction path" in the context of this disclosure means that the heat conduction from a front side or a tip of the single-branched thermal conduction path, where the temperature measurement sensor or the reference temperature sensor in a vicinity of the surface of the vessel wall are located, to an outside—the environment in the sense of a thermal reservoir—or vice versa to the inside—in the case of cold processes—can be described in a good approximation by a linear string of thermal resistances along this path. Lateral heat flow leakages or inflows occur only to a small extent. Using other words the single-branched thermal conduction path can be essentially a single-branched thermal conduction path.

Such a single-branched thermal conduction path can, for instance, be realized at least in part by a well-known thermometer rod, particularly with mineral insulated cabling.

Expressed differently, the term "single-branched thermal conduction path", can be understood as essentially single-branched thermal conduction path.

The temperature measurement sensor can be made from commercially available measuring inserts for industrial temperature measurement, so-called insets.

For high-temperature measurements in particular, these measuring inserts can be electrically coupled using mineral-insulated sheathed cabling, which is equipped with a temperature-sensitive element at one end or whose internal, unilaterally connected conductors already form a thermocouple. Such measuring inserts have the robustness and temperature resistance required in industrial environments, especially above 200° C., where standard cables and insulation materials cannot be used.

Electric leads for the temperature measurement sensor can preferably be located within the thermometer rod, which joins a housing for an electronic circuitry to determine a temperature based on a signal from the temperature measurement sensor. The tip of the first single-branched thermal conduction path, where the temperature measurement sensor is located, can be fixed by a base mounting, to mount the temperature sensor assembly to a pipe or vessel. The thermometer rod including a tip of the thermometer rod, the temperature measurement sensor and the electric leads can be an example of a single-branched thermal conduction path.

Instead of sheathed cables, cable sensor constructions or a combination of both can also be used according to the temperature sensor assembly. The thermometer rod and/or internal conduits may also be bent. Such thermometer rods are advantageously made of a low thermal conductivity material such as stainless steel.

Powder fillings can be used for the volume of the rod, particularly where the temperature measurement sensor is located.

The tip of a thermometer rod and/or a neck tube including the thermometer rod can be contacted directly to a pipe and/or surface of the vessel wall, whose surface temperature is to be measured. The heat transfer resistance of the surface to the tip of a thermometer rod can advantageously be reduced by a surface pressure generated at the measuring tip. This can be done, for example, by a spring loaded mechanism and/or screw mechanism and/or any mechanism, which is configured to apply consistent pressure Reference temperature sensors can be made from commercially available measuring inserts for industrial temperature measurement, so-called insets as described for the temperature measurement sensor.

Electric leads for the reference temperature sensor advantageously can have the same mineral-insulated sheathed cable as the temperature measurement sensor, additionally the second single-branched thermal conduction path can be built correspondingly to the first single-branched thermal conduction path, particularly in respect to the thermometer rod, so that the thermal resistance along the length from the reference temperature sensor to the electronics housing, and/or other thermal coupling to the environment, is as similar as possible and thus clearly defined.

The temperature measurement sensor can be distinguished from the reference temperature sensor by its property that the thermal coupling of the sensing element of the temperature measurement sensor to the surface is chosen to be stronger, that means, having a lower thermal resistance, than for one or several reference temperature sensors.

In detail, the at least one temperature measurement sensor is connected to a first measuring site on the vessel wall via a coupling with good thermal conductivity, characterised by a thermal resistance $R0$.

There are a lot of different configurations to build reproducible thermal couplings, characterised by the thermal resistance $R0$, of the temperature measurement sensor with the surface of the vessel wall as described below.

The temperature measurement sensor has a well-defined thermal resistance $Ru$ to the ambient, which can be characterised by an ambient temperature. In the case first single-branched thermal conduction path is realised using a standard thermometer rod, preferably inside of a neck tube, these thermal resistance is approximately proportional to the length of the thermometer rod between the respective temperature measuring site and the ambient, as for instance an electronics housing coupled to the first single-branched thermal conduction path for determination of the temperature using the temperature measurement sensor.

The respective reference temperature sensor advantageously can have a well-defined thermal resistance $R0\_ref$ to a second measuring site at the surface of the vessel and a well-defined thermal resistance $Ru\_ref$ to the ambient, which can be characterised by an ambient temperature. In case of a standard thermometer rod, this thermal resistance is approximately proportional to the length of the rod between the respective temperature measuring site of the reference temperature sensor and an ambient, as for instance at a location of the electronics housing.

The thermal resistance $Ru$ and/or $Ru\_ref$ also include the conductive, convective and radiative resistance between the outer surface of the standard thermometer rod and/or neck tube and ambient air.

That means, that the reference temperature sensor can be thermally coupled to the surface of the vessel wall in such a way, that the thermal resistance between the reference temperature sensor and the surface of the vessel wall is higher than the thermal resistance between the measurement temperature sensor and the surface of the vessel wall at their respective sites.

The temperature measurement sensor can be coupled to the surface of the vessel wall to be characterized by a thermal resistance $R0$ which is smaller than a thermal resistance $R0\_ref$ between surface of the vessel wall and the reference temperature sensor.

Advantageously the first single-branched thermal conduction path is thermally quite similar structured to the second single-branched thermal conduction path taking into account, that they are configured with a well-defined difference of $R0$ and $R0\_ref$. Reasonably, e.g. a ratio between the coupling of the reference temperature sensor and the temperature measurement sensor to the surface of the vessel wall can be: $R0\_ref/R0$ with a ratio of greater than 1, or preferably within a range of greater than 1 to 10, or more preferably within a range of 1.1 to 10.

Particularly: $R0\_ref \neq R0$ and/or $Ru\_ref \neq Ru$ and/or the ratio $Ru\_ref/R0\_ref$ of the thermal resistances of the reference sensor to the environment or to the surface is chosen slightly different from the above mentioned $Ru/R0$: $Ru\_ref/R0\_ref \neq Ru/R0$.

In this case:

$$R1 = R0\_ref - R0, \text{ and } R2 = Ru\_ref$$

can be defined and compensation can be carried out in the same way as suggested in WO2019/063519. Advantageous ratios of R2/R1 can be, for example 100, 50, 10 or 2.

There are a lot of configurations to set up this different thermally coupling of the reference temperature sensor in a reproducible way as described below.

In general the reference temperature sensor can be configured within the second single-branched thermal conduction path such that there is a distance gap, which is bigger than for the temperature measurement sensor, between the reference temperature sensor and the surface of the vessel wall, wherein the distance gap includes air and/or gas and/or a solid material. Alternatively or additionally, the distance of the gap can be achieved by a distance between the rod, wherein the reference temperature sensor is mounted, and the surface of the vessel wall.

Alternatively or additionally a sufficiently different thermal coupling can be provided by using a different coupling material for the reference temperature sensor, or the rod wherein the reference temperature sensor is mounted, with the surface of the vessel wall, in contrast to the coupling material of the temperature measurement sensor with the surface of the vessel wall. For instance, an exchange of a coupling material from nickel to steel can provide a different thermally coupling, or placing a filler material around the reference temperature sensor, which is not placed around the temperature measurement sensor may provide the different thermal coupling. But it's important that the reference temperature sensor is thermally coupled in a different way than the measurement temperature sensor to the vessel wall.

The finishing plate of the thermometer rod may be chosen to be made of Nickel.

Further options to modify the contact resistance between the temperature measurement sensor R0 and the reference temperature sensor R0_ref the surface of the vessel wall can be provided by:
- improving the thermal coupling using caps around the temperature measurement sensor, which are made from highly thermal conductive material, as for instance silver and/or copper;
- improving the thermal coupling of the temperature measurement sensor by use of thermal adhesives;
- Different tip design or materials at the insets: e.g. nickel (Ni) vs stainless steel (SST), which can be a material of a plug at the thermometer rod's end;
- different caps at the tip of the first and second single-branched thermal conduction path having more or less thermal conductive materials;
- different fillings and/or pottings around the respective sensing element within the thermometer rod, like aluminium oxide (AlO), air etc.
- in contrast to the temperature measurement sensor the reference temperature sensor can:
- touch the pipe directly;
- can be coupled using a specific adapter, which can act as a thermal resistor; or
- it can couple to the surface of the vessel wall through a gap, e.g. filled with air.

The difference in thermal coupling can also advantageously be produced by different contact pressures of the two sensor arrangements for the temperature measurement and the reference temperature measurement against the surface, which can be of the same construction. In the case of thermometer rods, this can be done by loading each thermometer rod by its own spring and/or a spring loaded mechanism and/or screw mechanism and/or any mechanism, which is configured to apply consistent pressure against the surface of the vessel wall. In general, each thermometer rods can be mechanically coupled to the vessel wall using a mounting device and pressed to the surface using essentially a single spring.

According to an aspect, a ratio of Ru/R0 of the thermal resistances of the temperature measurement sensor to the environment in relation to a thermal resistance of the measurement sensor to the surface of the vessel wall should be as large as possible, e.g. 100, 50, or 10.

According to an aspect, the temperature sensor assembly includes a plurality of temperature measurement sensor is and/or a plurality of reference temperature sensors.

The temperature sensor assembly is configured in such a way, that the temperature measurement sensor and the reference temperature sensor are essentially thermally uncoupled. That means that the temperature measurement sensor and reference temperature sensor each are configured to be arranged within substantially uncoupled thermal paths, wherein each tip of the respective path is adjacent to the surface of the vessel wall and the respective single-branched thermal conduction paths extend from the tip to an ambient of the temperature sensor assembly, thereby insulating or separating the first and the second single-branched thermal conduction path.

Using other words the reference temperature sensor, e.g. arranged inside of an respective thermometer rod, is configured without any thermal coupling elements to the temperature measurement sensor, and e.g. pressed with a tip of the thermometer rod to the surface.

According to an aspect, the first single-branched thermal conduction path and the second single-branched thermal conduction path are thermally coupled remote from the surface of the vessel wall by means of a thermal conductive bridge, wherein preferably the thermal conductive bridge is made from a highly thermal conductive material, as e.g. silver and/or copper and/or a heat pipe.

Preferably the thermal conductive bridge is located at the ambient end of both single-branched thermal conduction paths to establish uniform thermalization of the thermal conduction paths at the ambient or environment end of the at least two thermal paths. This means that an approximately identical temperature of the coupled thermal paths can be ensured at this end. Resulting in approximately identical boundary conditions for both single-branched thermal conduction paths.

Mechanical bridges, i.e. thermally insulating mechanical couplings, between the two single-branched thermal conduction paths can be located near the surface of the vessel wall, but also at other sites along the respective thermal conduction paths, which can support mechanical stability.

Such mechanical bridges can be made of materials with low thermal conductivity, not too different from air: foams of several materials, e.g. polymers, glass etc. Part of the neck tube and adapter structures may be filled with such materials.

More than one temperature measurement sensor and/or more than one reference temperature sensor can be placed within each single-branched thermal conduction path for compensation, and more than two thermal paths can be built e.g. for redundancy.

The surface temperature can be determined by the formula:

$$T\_surface = T1 + a(T1-T2) + b(T2-T\_amb) + c\ T1 + d\ T2 + e\ T\_amb + f(T1, T2, T\_amb)$$

wherein a, b, c, d, e are constants to be defined by calibration, wherein each of this constant can be determined to be 0. The relationship: f(T1, T2, T_amb) can be a freely definable, e.g. non-linear, function, which can be determined to be zero.

T1 is a temperature value determined by using the temperature measurement sensor and T2 is a temperature value determined by using the reference temperature sensor and T_amb is an ambient temperature value.

For determining a temperature of a medium inside the vessel, using the temperature sensor assembly, which is non-invasive, a model-based calculation can be used based on a temperature reading determined using the temperature sensor assembly to accurately determine the surface temperature of the surface of the vessel wall.

The medium can be any fluid including a liquid and/or gas and/or a bulk material or any mixture of these like aerosols and multi-phase flows.

The model-based calculation can be performed by a software tool that determines the medium temperature based on the outer surface temperature of the vessel wall determined by the non-invasive temperature sensor assembly.

The determination of the temperature can be done accordingly to the method as disclosed in the patent application WO2019063519 A1.

Using this temperature sensor assembly for determining of process temperatures can cost-effectively enhance the confidence of temperature measurement readings as used in the process industry and may improve the process quality.

An accurate, reliable, stable and quickly responsive surface temperature measurement by contact thermometry is provided by the at least two thermally insulated single-branched thermal conduction paths respectively for the temperature measurement sensor and the at least one reference measurement sensor thermally coupled to the surface of the vessel differently using the temperature sensor assembly.

According to an aspect it is proposed that, the measurement sensor and the reference sensor are not positioned within one single thermal path, but are accordingly positioned individually within two different thermal paths, which are thermally decoupled.

According to an aspect it is proposed that, the first thermal path and the second thermal path are different.

According to an aspect a thermal coupling between the reference temperature sensor and the first single-branched thermal conduction path is smaller than a thermal coupling between the reference sensor and the measurement sensor, if the temperature sensor assembly is mechanically coupled to the wall of the vessel.

Using other words, that means that the temperature sensor assembly is configured such that the thermal coupling between the reference sensor and the measurement sensor is dominated by thermal conduction path between the tip of the first single-branched thermal conduction path and the tip of the second single-branched thermal conduction path, which are in physical contact to the surface of the vessel wall and/or that a thermal coupling between the reference sensor and the first single-branched thermal conduction path is so small, that in practice it can be neglected in respect to the thermal coupling via the surface of the vessel wall, if the temperature sensor assembly is mechanically coupled to the surface of the vessel wall for determining the temperature of the surface of the vessel wall.

According to an aspect, the thermal coupling between the reference temperature sensor and the temperature measurement sensor is dominated by a series connection of the first thermal resistance and a part of the vessel wall, coupled to the first and second single-branched thermal conduction path, and the second thermal resistance, if the temperature sensor assembly is mechanically coupled to the wall of the vessel.

At least the first thermal path is insulated in such a way that the coupling of the reference temperature sensor to the first thermal path is smaller than the coupling of
the reference temperature sensor to the measurement sensor via the surface of the vessel wall.

That means, that the shortest thermal path between the temperature measurement sensor and the reference temperature sensor can be defined by a serial thermal connection of the first thermal resistance and the second thermal resistance and the thermal resistance between the sides, where the tip of the first single-branched thermal conduction path and the tip of the second single-branched thermal conduction path contact the surface of the vessel wall. Using other words, the first temperature sensor and the second temperature sensor are mainly coupled by the first thermal resistance and the second thermal resistance, wherein the thermal coupling of the first thermal resistance with the second thermal resistance is provided by the surface of the vessel wall.

A calculation of a thermal coupling between an example reference temperature sensor and an example temperature measurement sensor is performed for illustration of the related thermal coupling.

A thermal coupling between the two single-branched thermal conduction paths is calculated by an simplified example of the thermal coupling between two thermometer rods, which include the temperature measurement sensors.

The temperature of the wall of the pipe is assumed to be identical at the two close adjacent sites or somewhat distanced sites, where the first single-branched thermal conduction path is thermally coupled to the wall of the pipe and the second single-branched thermal conduction path is thermally coupled to the wall of the pipe.

That is because of a good thermal coupling of the fluid within the pipe with the pipe wall, and the thermal conductivity of the pipe wall, which can be made by metal, and/or a turbulent advective state of the fluid inside of the pipe, in the sense that it provides almost a perfect thermal boundary condition on the inner side of the wall. The thermal resistance of the related part of the pipe wall is, therefore, essentially independent from the lateral distance of the first and single-branched thermal conduction paths touching points at the vessel surface. Thus, a pipe wall made from plastics, which is less thermally conductive than stainless steel, can also be used for determining a temperature of a surface of the vessel wall using the described temperature sensor assembly.

A diameter of a 20 cm length-thermometer rod is assumed to be 3 mm. The two thermometer rods are adjacent to each other within a distance d of d=5 mm. A resulting interaction area can be estimated as a projected area F: F=3 mm*20 cm=6.*10$^{-4}$ m$^2$ A resulting thermal coupling conductivity C_betweenPaths of the thermometer rods via a gap distance d filled with non-convective air can be calculated to be:

$$C\_betweenPaths = c\_air * F/d = 24 \text{ mW}/(K*m) * F/d = 1.44*10^{-5} \text{ W*m/K}/5 \text{ mm} = \text{approx} 3.14*10^{-3} \text{ W/K}$$

With a thermal conductivity of air c_air=0.0262 W/m K, which can vary from approx 0.02 at −50° C. to 0.05 at +400° C.

This is an upper estimation of the thermal coupling between the reference temperature sensor and the first single-branched thermal conduction path, because it does not take into account an internal thermal coupling of the reference temperature sensor with the housing of the thermometer rod.

A thermal coupling between the two temperature sensors mounted inside of the thermometer rods can be calculated: A contact area A of the tip of the respective thermometer rods is approximately $$A=(1.5\text{ mm})^2 * \pi.$$

A contact pressure F of 10 N resulting in a pressure P of $1.41*10^{+6}$ Pa.

By a metal-metal thermal conductive conductivity c of:

$$c=(\text{approx.})10^4 \text{ W}/(\text{m}^2 * \text{K})[\text{stainless steel-SST interface}]$$

This value c can be easily derived from, e.g., Bergman et al., Fundamentals of Heat and Mass Transfer, $7^{th}$ ed. 2011, p. 118, Table 3.1, depending on the related pressure. Resulting in a contact conductivity C_contact of:

$$C\_contact=c*A=7.07*10^{-2} \text{ W/K}$$

Thus, it is shown that within this typical example, the thermal contact conductivity C is bigger than the thermal coupling conductivity C_betweenPaths $$C\_betweenPaths<C\_contact.$$

Adding two thermal contact conductivities results in an estimation of the thermal coupling between the two temperature sensors.

According to an aspect, the first single-branched thermal conduction path and/or the second single-branched thermal conduction path are insulated by a low thermal conducting material to reduce a thermal coupling between the first single-branched thermal conduction path and the second single-branched thermal conduction path.

Such a low thermal conducting material includes thermal insulation material and/or gases. Advantageously coupling the respective single-branched thermal conduction path with low thermal conducting materials enables to couple the temperature measurement sensor and the reference temperature sensor in a way to improve and/or adapt the determination of the surface temperature of the vessel wall according to specific needs resulting from technical circumstance.

According to an aspect, the first single-branched thermal conduction path and/or the second single-branched thermal conduction path are/is mounted inside a neck tube to reduce the thermal coupling between the first single-branched thermal conduction path and the second single-branched thermal conduction path; and/or to reduce a thermal coupling of the first single-branched thermal conduction path and/or the second single-branched thermal conduction path to an environment of the temperature sensor assembly. Thermal decoupling of the first single-branched thermal conduction path and the second single-branched thermal conduction path can improve the determination of the surface temperature of the vessel wall by use of the temperature sensor assembly.

According to an aspect, the single-branched thermal conduction path or the second single-branched thermal conduction path is mounted inside a second tube, wherein the second tube is mounted essentially concentrically inside of the neck tube; and preferably the second tube is evacuated to reduce the thermal coupling between the first single-branched thermal conduction path and the second single-branched thermal conduction path.

Expressed differently, the temperature sensor assembly can include an inner and an outer cylinder, i.e., the second tube and the neck tube respectively, wherein preferably the measurement sensor is mounted in the annular space of the neck tube between the second tube and the neck tube. The reference sensor can be mounted inside of the second tube, wherein either the annular space or the inner cylindrical space or both are evacuated or thermally insulated in a different form. Alternatively the reference sensor is mounted in the annular space of the neck tube and the measurement sensor is mounted inside of the second tube.

This can improve the thermal insulation between the first single-branched thermal conduction path and the second single-branched thermal conduction path.

According to an aspect, the first single-branched thermal conduction path and/or the second single-branched thermal conduction path is configured to spring load a surface contact of the first single-branched thermal contact path and/or the second single-branched thermal conduction path with the surface of the vessel wall. Spring loading the surface contact advantageously enable to adapt the thermal coupling of the respective single-branched thermal conduction path to specific needs, and particularly to improve the thermal coupling.

According to an aspect, the temperature measurement sensor is thermally coupled to the surface of the wall of the vessel by a plug comprising a first means for thermal coupling the measurement sensor to the surface of the wall of the vessel comprising highly thermal conducting material for improving the thermal coupling between the measurement sensor and the surface of the wall of the vessel, and wherein the first means is placed between the measurement sensor and the surface of the wall of the vessel.

According to an aspect, the reference temperature sensor is coupled to the surface of the wall of the vessel by a spatial gap and/or by a second means for thermal coupling the reference sensor to the surface of the wall of the vessel comprising a low thermal conductive material for thermal at least partially decoupling the reference sensor to the surface of the wall of the vessel, and wherein the second means is located between the reference temperature sensor and the surface of the wall of the vessel.

Such a spatial gap can couple the reference temperature sensor to the surface of the wall of the vessel without mechanical contact to define the thermal contact resistance R0_ref.

A second means for thermal coupling can be located at a tip at the second single-branched thermal conduction path, as e.g. a thermometer rod and/or a tube including the reference sensor, made from nickel (Ni) or stainless steel. The second means can include various fillings/pottings around the sensing element of the reference sensor inside of the thermometer rod and/or the tube, like e.g. aluminium oxide and/or air.

According to an aspect, the temperature sensor assembly includes at least one further reference sensor. Using further reference sensors can improve the determination of the surface temperature of the wall of the vessel.

Signals from further reference sensors can be used for averaging or other statistical analysis and signal processing.

According to an aspect, the temperature measurement sensor and/or the reference temperature sensor comprises a resistance thermometer and/or a thermocouple.

Such resistance thermometer can be a PTC-thermistor and/or a PTC-resistor. Additionally or alternatively the temperature measurement sensor and/or the reference temperature sensor can include any means to determine a temperature of the surface of the vessel.

According to an aspect, a method for determining a temperature of a medium via a temperature of a measuring point on a surface enclosing the medium is proposed, which includes a temperature sensor assembly as described above, as well as an analysing device for determining the medium temperature of the vessel wall, which is electrically connected to the temperature sensor assembly, wherein at least one reference sensor of the temperature sensor assembly is used to determine a temperature gradient along a first thermal connection path between a surface enclosing the medium and an environment of the temperature sensor assembly and wherein, utilizing the temperature gradient along the first thermal connection path, a correction value for correcting a measured value of at least one measuring sensor of the temperature sensor assembly is determined.

According to an aspect, a measurement system for determining a temperature of the surface of the vessel wall is proposed, including a temperature sensor assembly as described above and an analysing device for determining the surface temperature of the vessel wall, wherein the temperature sensor assembly is electrically connected to the analysing device.

A use of the temperature sensor assembly as described above is proposed for determining a surface temperature of a wall of a vessel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A temperature sensor assembly configured to be coupled thermally to a vessel wall for determining a temperature of a surface of the vessel wall, the assembly comprising:
   a first single-branched thermal conduction path defined between the surface of the vessel wall and an environment of the temperature sensor assembly, wherein the first single-branched thermal conduction path includes a temperature measurement sensor that is configured to be thermally coupled to a first site of the surface of the vessel wall resulting in a first thermal resistance; and
   a second single-branched thermal conduction path defined between a second site of the surface of the vessel wall and an environment of the temperature sensor assembly, wherein the second single-branched thermal conduction path includes a reference temperature sensor that is configured to be thermally coupled to the surface of the vessel wall resulting in a second thermal resistance,
   wherein the first single-branched thermal conduction path or the second single-branched thermal conduction path are insulated by an insulating material to reduce a thermal coupling between the first single-branched thermal conduction path and the second single-branched thermal conduction path.

2. The temperature sensor assembly according to claim 1, wherein a thermal coupling between the reference temperature sensor and the first single-branched thermal conduction path is smaller than a thermal coupling between the reference temperature sensor and the temperature measurement sensor when the temperature sensor assembly is mechanically coupled to the wall of the vessel.

3. The temperature sensor assembly according to claim 2, wherein the thermal coupling between the reference temperature sensor and the temperature measurement sensor is dominated by a series connection of the first thermal resistance and a part of the vessel wall that is coupled to the first single-branched thermal conduction path and second single-branched thermal conduction path, and the second thermal resistance, when the temperature sensor assembly is mechanically coupled to the wall of the vessel.

4. The temperature sensor assembly according to claim 1, wherein at least one of the first single-branched thermal conduction path and the second single-branched thermal conduction path are/is mounted inside a neck tube to reduce the thermal coupling between the first single-branched thermal conduction path and the second single-branched thermal conduction path, and which also reduces a thermal coupling of the first single-branched thermal conduction path and/or the second single-branched thermal conduction path to an environment of the temperature sensor assembly.

5. The temperature sensor assembly according to claim 4, wherein the single-branched thermal conduction path or the second single-branched thermal conduction path is mounted inside a second tube, wherein the second tube is mounted concentrically inside of the neck tube; and wherein the second tube is evacuated to reduce the thermal coupling between the first single-branched thermal conduction path and the second single-branched thermal conduction path.

6. The temperature sensor assembly according to claim 1, wherein at least one of the first single-branched thermal conduction path and the second single-branched thermal conduction path is/are configured to spring load a surface contact of the first single-branched thermal contact path and/or the second single-branched thermal conduction path with the surface of the vessel wall.

7. The temperature sensor assembly according to claim 1, wherein the measurement sensor is thermally coupled to the surface of the wall of the vessel by a plug comprising a first means for thermal coupling the measurement sensor to the surface of the wall of the vessel comprising highly thermal conducting material for improving the thermal coupling between the temperature measurement sensor and the surface of the wall of the vessel, and wherein the first means is placed between the temperature measurement sensor and the surface of the wall of the vessel.

8. The temperature sensor assembly according to claim 1, wherein the reference temperature sensor is coupled to the surface of the wall of the vessel by a spatial gap and/or by a second means for thermal coupling the reference temperature sensor to the surface of the wall of the vessel comprising a thermal conductive material for at least partially decoupling the reference temperature sensor to the surface of the wall of the vessel, and wherein the second means is located between the reference temperature sensor and the surface of the wall of the vessel.

9. The temperature sensor assembly according to claim 1, comprising at least one further reference sensor.

10. The temperature sensor assembly according to claim 1, wherein the temperature measurement sensor and/or the reference temperature sensor comprises a resistance thermometer and/or a thermocouple.

11. The temperature sensor assembly according to claim 1, further comprising an analyzing device for determining the surface temperature of the vessel wall, wherein the temperature sensor assembly is electrically connected to the analyzing device.

12. A method for determining a temperature of a medium via a temperature of a measuring point on a surface enclosing the medium, comprising:

providing a temperature sensor assembly, the temperature sensor assembly configured to be coupled thermally to a vessel wall for determining a temperature of a surface of the vessel wall, the assembly comprising a first single-branched thermal conduction path defined between the surface of the vessel wall and an environment of the temperature sensor assembly, wherein the first single-branched thermal conduction path includes a temperature measurement sensor that is configured to be thermally coupled to a first site of the surface of the vessel wall resulting in a first thermal resistance; and a second single-branched thermal conduction path defined between a second site of the surface of the vessel wall and an environment of the temperature sensor assembly, wherein the second single-branched thermal conduction path includes a reference temperature sensor that is configured to be thermally coupled to the surface of the vessel wall resulting in a second thermal resistance, and wherein the first single-branched thermal conduction path or the second single-branched thermal conduction path are insulated by an insulating material to reduce a thermal coupling between the first single-branched thermal conduction path and the second single-branched thermal conduction path;

providing an analyzing device for determining the temperature of the medium inside the vessel wall, which is electrically connected to the temperature sensor assembly;

wherein the at least one reference temperature sensor of the temperature sensor assembly is used to determine a temperature gradient along a first thermal connection path between a surface enclosing the medium and an environment of the temperature sensor assembly; and wherein the method includes utilizing the temperature gradient along the first thermal conduction path a correction value for correcting a measured value of at least one temperature measuring sensor of the temperature sensor assembly is determined.

* * * * *